United States Patent
Quintas et al.

(10) Patent No.: US 11,038,924 B2
(45) Date of Patent: *Jun. 15, 2021

(54) DETERMINING A DEVICE POSTURE USING A DEVICE POSTURE TOKEN

(71) Applicant: AirWatch LLC, Atlanta, GA (US)

(72) Inventors: Dan Quintas, Atlanta, GA (US); Anthony Kueh, Palo Alto, CA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,625

(22) Filed: Jan. 3, 2020

(65) Prior Publication Data

US 2020/0145462 A1 May 7, 2020

Related U.S. Application Data

(63) Continuation of application No. 15/193,247, filed on Jun. 27, 2016, now Pat. No. 10,530,813.

(51) Int. Cl.
*H04L 29/06* (2006.01)
*G06F 21/44* (2013.01)
*H04W 12/77* (2021.01)
*H04W 12/108* (2021.01)

(52) U.S. Cl.
CPC ............. *H04L 63/20* (2013.01); *G06F 21/44* (2013.01); *H04L 63/08* (2013.01); *H04L 63/126* (2013.01); *H04W 12/108* (2021.01); *H04W 12/77* (2021.01)

(58) Field of Classification Search
CPC . H04L 63/0876; H04L 63/20; H04L 63/0442; G06F 21/44; G06K 7/1417
USPC ......................................................... 713/168
See application file for complete search history.

(56) References Cited

U.S. PATENT DOCUMENTS

2013/0262650 A1* 10/2013 Sutherland ............ H04L 63/029 709/223
2014/0020070 A1* 1/2014 Angal .................... H04L 63/12 726/5

* cited by examiner

*Primary Examiner* — Brandon S Hoffman
*Assistant Examiner* — Nega Woldemariam
(74) *Attorney, Agent, or Firm* — Thomas | Horstemeyer LLP

(57) ABSTRACT

Disclosed are various approaches for generating a device posture token corresponding to a client device. The device posture token can be used by a verification computing device to determine whether the client device complies with the security policies of a particular facility.

20 Claims, 7 Drawing Sheets

DETERMINING A DEVICE POSTURE USING A DEVICE POSTURE TOKEN

CROSS-REFERENCE TO RELATED APPLICATIONS

This application is a continuation of and claims the benefit of U.S. patent application Ser. No. 15/193,247, entitled "DETERMINING DEVICE POSTURE USING A DEVICE POSTURE TOKEN," and filed Jun. 27, 2016, which is hereby incorporated by reference in its entirety.

BACKGROUND

In today's environment, smartphones and other devices are becoming more and more ubiquitous and more essential to users, both for personal and enterprise uses. Many users prefer not to go any period of time without their devices in their possession. Client devices issued by an enterprise can be managed by a management service that provides the ability to remotely manage or administer devices that are enrolled with the management service as a managed device. For example, devices can be enrolled with a remotely executed management service using application programming interfaces (APIs) or other capabilities that are embedded within the operating system of the device. A management component can also be installed on a client device so the device can be locally managed by the management component and remotely managed by the management service.

Certain facilities, such as government facilities or sensitive corporate facilities, can impose policies that restrict what devices can be physically brought into the facility. For example, a government facility where highly classified or sensitive information is housed might restrict devices that have cameras from brought into the facility. As another example, a facility might restrict devices having certain applications from being brought into a facility. To comply with such restrictions, the device can be configured to adhere to the restrictions, either through a manual configuration of the device by the user or through management of the device by a management service and/or management component.

However, when a device complies with the restrictions or requirements set forth by such a facility, there was previously no convenient way for security personnel of the facility to validate that the device is compliant when the user wishes to enter the facility.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
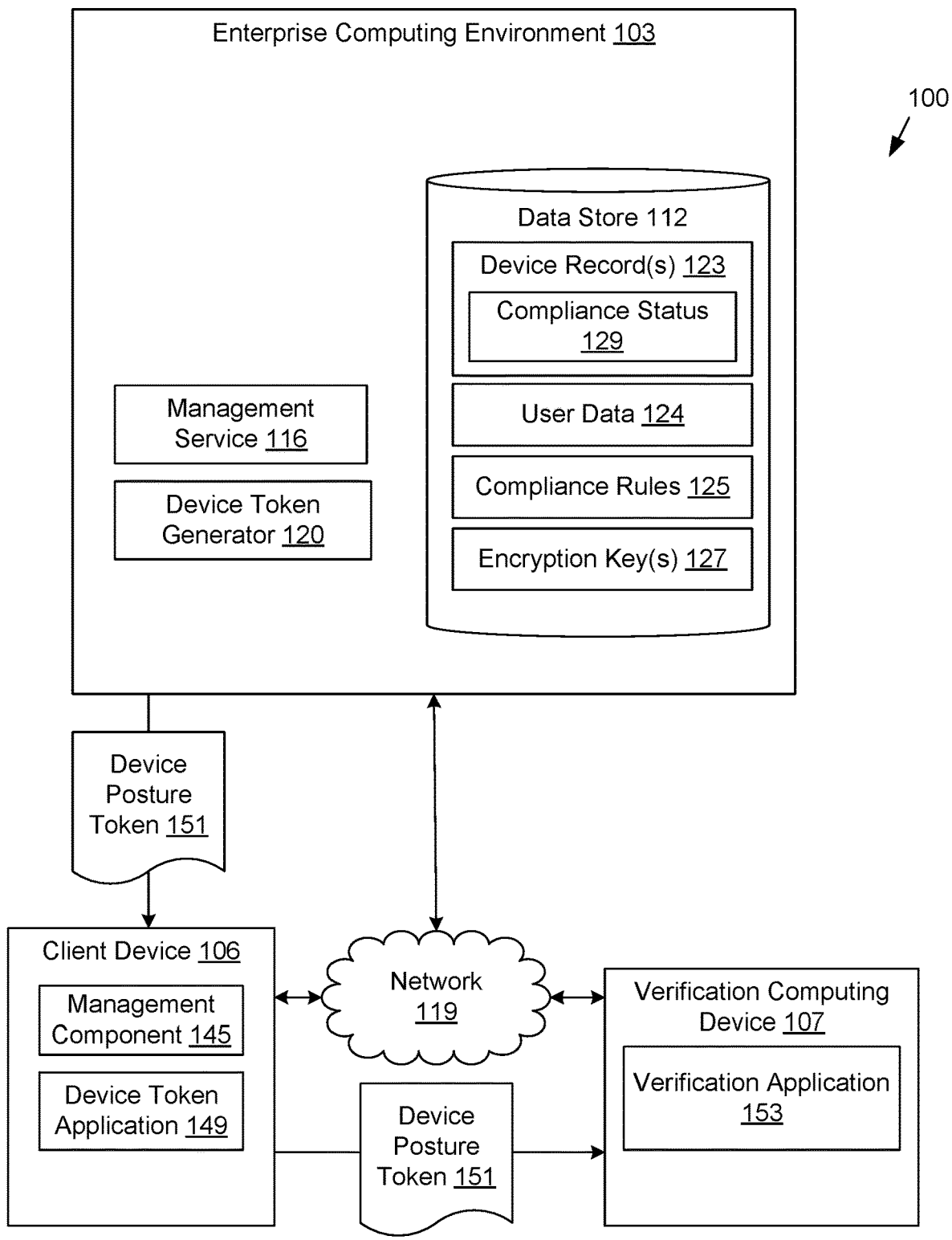
FIG. 1 is a schematic block diagram depicting an example implementation according to various examples of the disclosure.

Disclosed are examples of a system that creates a device posture token that can allow for verification of a device's compliance with one or more compliance rules. In many corporate, government, or other types of facilities, computing devices such as smartphones, tablets, or other computing devices are often banned from entering the building. In many cases, these outright bans exist because security personnel cannot (or cannot easily) verify whether the devices of visitors comply with the policies that an organization owning or operating the facility has in place for security reasons. In one example, the enterprise owning or operating the facility might require that any device sensor capable of capturing confidential information be disabled for such device to be permitted to enter the facility. For instance, the facility might require that a camera and a microphone of the device be disabled.

More particularly, the above described technical problem predominantly occur in two scenarios. First, the technical problems can occur in a scenario where an employee of an enterprise wishes to bring their device into a facility owned or operated by such enterprise. In this case, security personnel would not likely be authorized to access an administrative console of a management service that manages the employee's device ("facility management service"), as that permission would likely be restricted to Information Technology personnel. Nevertheless, were security personnel to be authorized, the security personnel could only determine compliance of the particular employee's device through a tedious process using the facility management service. In particular, the security personnel would need to authenticate to gain access to the facility management service, query to find a device record associated with the particular employee's device, and determine whether there is any indication that the device is out of compliance with the security policies required for the device to be permitted to be brought into the facility. This process is burdensome and would cause significant delays in processing of individuals at security checkpoints.

Second, further technical problems may occur in a scenario where an employee of a first enterprise wishes to bring their client device into a facility owned or operated by a second enterprise, such as when the employee is a contractor or visitor ("foreigner"). In this case, the foreigner's client device would likely be managed by a management service associated with the first enterprise ("foreign management service"), and security personnel of the second enterprise would not likely capable of determining whether the foreigner's client device is compliant with the security policies. In particular, it is unlikely that the security personnel of the second enterprise would be authorized to access the foreign management service to identify state information associated with the foreigner's client device, precluding the security personnel from determining compliance. Consequently, a technical solution is needed to provide security personnel with a mechanism to determine the compliance of a device before it is allowed to enter the facility (both for devices associated with the enterprise owning or operating the facility and devices that are associated with visitors).

Accordingly, examples of the disclosure include systems and methods to determine whether a user's device is compliant with compliance policies by way of a device posture token. In one scenario, a device posture token can be generated by a management service with which a client device is enrolled. In one example, the device posture token can identify one or more compliance rules that comprise security policies and the status of the client device with respect to those rules. In another example, the device posture token can describe the state of the client device, which can then be compared to security policies to determine the status of the client device with respect to such. In yet another example, the device posture token can comprise a credential configured to provide access to a network-driven application programming interface (API) command of the management service, which can cause the management service to transmit, to a device from which the API command was received, one or more of the security policies, the compliance status of the client device with respect to such, or state information describing the client device. In any case, the management service can provide the device posture token to the client device by transmitting it over a network (e.g., through a device management messaging protocol).

The client device can then provide the device posture token to a verification computing device (e.g., a hand-held device configured to receive a device posture token), such as one operated by security personnel of a facility upon entrance to the facility. For instance, the client device can display a visual representation of the device posture token (e.g., quick response (QR) code, two-dimensional barcode, other representation of an alphanumeric number) on a display of the client device and the verification device can use a camera sensor of the verification device to capture the visual representation and thereby access the associated device posture token. Alternatively, the client device can provide the device posture token to the verification device by transmitting it over a network (e.g., NFC, Bluetooth, Wi-Fi, cellular).

Using the device posture token, the verification device can determine whether the client device complies with its organization's security policies and, thus, whether the security personnel should permit the client device to be taken into the facility or whether the security personnel should prohibit the client device from being taken into the facility. In one example, the verification device can determine whether the device posture token indicates whether the client device is compliant with the security policies. In another example, the verification device can identify state information associated with the client device from the device posture token and can compare it to the security policies to determine whether the client device is compliant with such. In a further example, the verification device can identify a credential and/or a network-driven API command from the device posture token, which the verification device can use to cause the management service to provide the verification device with (e.g., transmit to it) one or more of the security policies, the compliance status of the client device with respect to such, or the state information associated with the client device that can be used by the verification device to determine compliance status of the client device as described above. In any case, the verification device can use the device posture token to provide security personnel with the compliance status of the client device, which the security personnel can use to base their decision to permit or deny admittance of the client device into the facility.

Additionally, a trusted computing relationship can be established between the management service associated with the client device and the verification device to provide the verification device with a mechanism to verify the authenticity of the device posture token (and the contents thereof). Establishing such a trusted computing relationship can involve providing the verification device with a public key associated with the management service associated with the client device. To prevent security breaches, administrator authorization may be required for the trusted computing relationship to be established. That is, before the public key associated with the management service associated with the client device is provided to or accepted by a verification device, an administrator of one or more of the management service associated with the client device or the verification device may need to authorize the establishment of the trusted computing relationship. Once the verification device has access to the public key associated with the management service associated with the client device, the verification device can use the public key to decrypt the device posture token. Further, the verification device can use the decrypted device posture token to determine whether the client device associated with device posture token is in compliance with the organization's security policies.

FIG. 1 illustrates an example of a networked environment 100 according to examples of the disclosure. In the depicted network environment 100, an enterprise computing environment 103 is in communication with at least one client device 106 and at least one verification computing device 107 ("verification device") over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, a device token generator 120, and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116. The management service 116 can initiate installation of applications as managed applications. The management service 116 can also initiate installation of configuration profiles that can be accessed by certain applications installed on a client device 106.

The management service 116 can include a management console that can allow administrators to manage client devices 106 that are enrolled with the management service 116. User interfaces can allow an administrator to define policies for a user account or client devices 106 associated with an enterprise environment. The user interfaces can also include, for example, presentations of statistics or other information regarding the client devices 106 that can be managed by the management service 116.

The enterprise computing environment 103 can also execute a device token generator 120. The device token generator 120 can generate a device posture token 151 that can include one or more of a representation of one or more compliance rules that comprise the security policies of an enterprise, a representation of the compliance status of a client device 106, or other hardware and software properties of the client device 106 (i.e., state information). The device token generator 120 can encode the compliance status of the client device 106 and other metadata about the client device 106 into data structure or other alphanumeric encoding that can be encoded within a QR code or other data representation. In some examples, the device posture token 151 can be provided by the device token generator 120 or management service 116 directly to the client device 106. The device posture token 151 can then be provided by the client device 106 to the verification device 107, which can verify whether the client device 106 complies with the security policies of the organization associated with the verification device 107, such as the admittance policies to a particular facility.

The data stored in the data store 112 can include device records 123, user data 124, compliance rules 125, and potentially other data. Device records 123 can include correspond to client devices 106 that are enrolled as managed devices with the management service 116. A device record 123 can include various security settings selected for enforcement on a client device 106 that is enrolled with the management service 116. Accordingly, a device record 123 can include a device identifier associated with a device, such as the client device 106, one or more device certificates, a compliance status 129, and other data. In some examples, a device record 123 can also identify a user associated with a particular client device 106. The compliance status 129 can indicate whether a particular client device 106 is in compliance with one or more compliance rules 125.

More specifically, the device record 123 can include one or more of: data describing the identity, type and components of the client device 106; data describing the state of the client device 106; data describing organizational groups to which the client device 106 belongs; data describing compliance rules 125 with which the client device 106 must comply; data describing management policies that specify if, when and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 116), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). More particularly, a device record 123 associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 116, whether the client device 106 is in a state of compliance with any applicable compliance rules 125, and whether any remedial actions have been (or are to be) taken as a result of a noncompliance with any applicable compliance rules 125. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record 123 can include data describing a command queue associated with the client device 106. For example, the management service 113 can maintain a command queue of commands that are designated for execution against the client device 106. As described herein, a client device 106 can be provisioned by the management service 116 by causing resources to be installed or stored on the client device 106. To implement such process, the management service 116 can store a command related to provisioning in the command queue. Additionally, the management service 116 can store a command related to a remedial action associated with a compliance rule 125 in the command queue, in the event that it is determined that a rule condition associated with the compliance rule 125 has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Finally, data describing compliance rules 125 with which the client device 106 must comply can, for instance, specify one or more security policies to which the client device 106 must adhere, a compliance status 129 of the client device 106, and one or more remedial actions that should be performed in the event that an associated rule condition occurs, as described later herein. In some embodiments, the data describing compliance rules 125 and the data describing management policies 133 is obtained from an organizational record associated with an organizational group 126 to which the client device 106 is a member (i.e., the compliance rules 125 associated with the organizational group 126 are reflected in the device record of the member client device 106).

A compliance status 129 of a client device 106 represents whether the device is in compliance with one or more compliance rules 125. Various compliance rules 125 can be enforced on the client device 106 by the management service 116. Compliance rules 125 can be based on time, geographical location, or device and network properties. For instance, the client device 106 can satisfy a compliance rule 125 when the client device 106 is located within a particular geographic location. The client device 106 can satisfy a compliance rule 125 in other examples when the client device 106 is in communication with a particular local area network, such as a particular local area network that is managed by the computing environment 203. Furthermore, a compliance rule 125 in another example can be based upon the time and date matching specified values.

A compliance rule 125 can specify that a client device 106 is required to be powered off or be in a low power "sleep" state during a specified time period. Another compliance rule 125 can specify that a client device 106 is required to be powered on or be in a normal operation "awake" state during a specified time period. As another example, a compliance rule 125 can specify that a client device 106 is prohibited from rendering content that has been designated as confidential. A compliance rule 125 can also specify whether a camera associated with the client device 106 must be enabled or disabled. The compliance rule 125 can also specify certain times of the day, week, or year in which certain hardware or software features are permitted to be enabled or disabled.

Another example of a compliance rule 125 involves whether a user belongs to a particular user group. For instance, a compliance rule 125 can include a whitelist or a blacklist that specifies whether particular users or groups of users are authorized to perform various functionalities, such as installing or executing a particular application.

Other examples of compliance rules 125 include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule 125 can specify that the client device 106 is required to authenticate a user using a password or personal identification number (PIN) in order to unlock the client device 106.

A compliance rule 125 can also require that the client device 106 have device encryption enabled, where data stored on the device is stored in an encrypted form. The data can be encrypted by a device certificate. A compliance rule 125 can also require that the client device 106 be enrolled with the management service 116 as a managed device. Another compliance rule 125 can specify that the user is required to accept the terms of service that are presented by the management component 145 on the client device 106. As another example, a compliance rule 125 can specify that the management component 145 is required to periodically communicate or "check-in" with the management service 116 to report on its status. If a threshold amount of time has elapsed since the previous check-in of the client device 106, the client device 106 can be considered to have violated this compliance rule 125.

Another compliance rule 125 can specify that a client device 106 run one of a specified variants or versions of a particular operating system. A compliance rule 125 can also specify that an enrolled device be manufactured by a particular manufacturer or have a particular manufacturer identifier. Another compliance rule 125 can specify that an enrolled device be a particular model name or model number. A client device 106 can also be considered out of compliance if the device is in a data roaming mode or has used a threshold amount of a periodic network data usage allowance.

A compliance rule 125 can also identify a list of required applications that must be installed on the client device 106 or a list of forbidden applications that cannot be installed on the client device 106. The management component 145 can remove a forbidden application or install a missing required application on the client device 106 in response to detecting a violation of such a compliance rule 125. A compliance rule 125 can also require the presence of a mobile device management (MDM) profile, an MDM storage area, an application profile, and/or a configuration profile. The management component 145 can obtain and store missing required data or containers on the client device 106 in response to detecting a violation of such a compliance rule 125.

Therefore, the compliance status 129 indicates whether and to what extent a particular client device 106 is compliant with compliance rules 125 assigned to the client device 106 by the management service 116. The compliance status 129 can be determined by a management component 145 on the client device 106 that analyzes the status of the client device 106 and reports compliance to the management service 116. In other examples, the compliance status 129 can be determined by the management service 116 based upon state information describing the client device 106, which can be reported by the management component 145. The compliance status 129 can also include the state of various hardware or software features of the client device 106 without respect to whether the status of the features are determined by a compliance rule 125.

User data 124 contains information about users who are associated with client devices 106 that are enrolled with the management service 116. User data 124 can include profile information about a user, authentication information about a user, applications that are installed on client devices 106 associated with the user, and other user information. For example, user data 124 can include information about client devices 106 that are associated with a user account of the user, enterprise resources to which a particular user has access, such as email, calendar data, documents, media, applications, network sites, or other resources. The user data 124 can also identify one or more user groups of which a particular user is a member, which can in turn define the access rights of the user to one or more enterprise resources as well as identify which applications should be deployed to a client device 106 associated with the user. To this end, the user data 124 can further identify one or more device identifiers that can uniquely identify client devices 106 that are associated with a user account of the user.

The encryption keys 127 can represent one or more sets of encryption keys that are associated with the enterprise computing environment 103. The encryption keys 127 can include a public key that is distributed to verification devices 107 and with which a device posture token 151 can be encrypted. The encryption keys 127 can also include a corresponding private key that is not distributed. The corresponding private key can be used by the device token generator 120 to encrypt the device posture token 151 in which the compliance status 129 of a client device 106 is encoded.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates, or write, modify or delete certain data from the client device 106. The management component 145 can also monitor the client device 106, generate state information describing the client device 106, and provide the management service 116 with such state information. For example, the state information can include the network activity of the client device 106, the location of the client device 106, whether enforce password or personal identification number (PIN) authentication is enforced, and/or whether other compliance rules 125 are being complied with by the client device 106. In one example, the state information can be generated by the management component 145 by receiving compliance rules 125 from the management service 116 over the network 119, comparing the state of the client device 106 to the compliance rules 125, and determining whether the client device 106 fails to satisfy the compliance rules 125.

To carry out local management of a client device 106, the management component 145 can be installed and executed with elevated or administrative privileges on the client device 106. In some scenarios, the operating system of the client device 106 can allow a particular application or package to be identified as a device owner or a device administrator, which can in turn configure the client device 106 using such privileges.

The client device 106 can also execute a device token application 149. The device token application 149 can request a device posture token 151 from the device token generator 120. In response, the device token generator 120 can generate the device posture token 151 by assessing the compliance status 129 of the client device 106. The device token generator 120 can then provide the device posture token 151 to the device token application 149. The device token application 149 can then provide the device posture token 151 to the verification device 107, which can determine whether the client device 106 complies with the security policies of an organization with which the verification device 107 is affiliated.

The token generator 120 can embed some or all of the compliance status 129 information associated with a requesting client device 106 into the device posture token 151. For example, the device posture token 151 can represent a data structure that identifies compliance rules 125 or other information about a client device 106, such as its operating system, hardware features, software features, whether certain hardware features are enabled, disabled, or restricted from being enabled or disabled by the management service 116 or the management component 145. The data structure can be encoded into a QR code or other digital or visual representation that the device token application 149 can obtain from the device token generator 120 and subsequently provide to the verification device 107 for verification.

The device posture token 151 can also be configured to expire. The device token generator 120 can embed a timestamp at which time the device posture token 151 is deemed to expire. The device token generator 120 can also embed a timestamp representing when the device posture token 151 was generated as well as a lifespan of the device posture token 151, after which the device posture token 151 is deemed to have expired.

The device posture token 151 can also be configured to include a credential and/or a network-driven API command associated with the management service 116. As described above, the verification device 107 can use the credential to authenticate to the management service 116. This may be required, as without such credential, a verification device 107 is unlikely to be permitted to communicate with a management service 116 that comprises a foreign management service. Once authenticated (if required by the management service 116), the network-driven API command can be used by the verification device 107 to cause the management service 116 to provide the verification device 107 with one or more of compliance rules 125, state information describing the client device 106, and an indication of whether the client device 106 complies with such compliance rules 125.

It is to be understood that there can be two different sets of compliance rules 125 with which the client device 106 must comply. First, the client device 106 can be subject to a first set of compliance rules 125 imposed by the management service 116 with which it is enrolled and by whom it is managed. That is, the client device 106 can be subject to security policies defined by the enterprise associated with the client device 106 (e.g., by virtue of the user of the client device 106 being an employee of the enterprise). Further, the client device 106 can be subject to a second set of compliance rules 125 imposed by the facility which a user of the client device 106 wishes to access (and within which the user wishes to possess her client device 106). In one example, the first set of compliance rules 125 and the second set of compliance rules 125 are not identical. Accordingly, while the device posture token 151 can include representations of the first set of compliance rules 125 (as the device posture token 151 can be generated by the management service 116 associated with such first set), the device posture token 151 may not include representations of the second set of compliance rules 125 (as the management service 116 may have no knowledge of the second set). Given this, in one example, the first set of compliance rules 125 can be excluded from the device posture token 151 to optimize the process given that such first set of compliance rules 125 may not help determine whether the client device 106 is compliant with the second set of compliance rules 125 associated with the facility.

Additionally, the public key associated with the private key with which the device posture token 151 is generated can be withheld from the client device 106 so that the device token application 149 cannot decrypt or modify the device posture token 151. In this way, security of the device posture token 151 can be ensured because the public key can be provided only to the verification device 107. In some examples, rather than a public and private key architecture, the device posture token 151 can be encrypted using a pre-shared key using a symmetric encryption-decryption framework, where the key is shared between the device token generator 120 and the verification device 107.

The verification device 107 represents a computing device, such as a barcode scanning device, a smartphone, or a personal computer. The verification device 107 can be coupled to a camera, a barcode scanner, a near-field communication interface, or any other communications interface. The verification device 107 can also be configured with a network communications interface to facilitate communications over the network 119. However, it is not essential for the verification device 107 to have a network communications interface. The verification device 107 can execute a verification application 153. The verification application 153 can obtain a device posture token 151 from the client device 106 over the network 119 or over another communication interface. For example, the verification application 153 can capture an encrypted form of the device posture token 151 as an alphanumeric value embedded within a QR code displayed on a display of the client device 106 by the device token application 149.

The verification application 153 can then decrypt the device posture token 151 using the public key associated with the enterprise computing environment 103 and extract information about the compliance status 129 of the client device 106. The verification application 153 can access security policies that are stored on or accessible to the verification computing device 107 that specify rules that determine whether a particular client device 107 is permitted to be carried into a particular facility (i.e., "the second set of compliance rules 125" described above). For example, for a certain facility, client devices 106 with an enabled capture sensor (e.g., camera, microphone) are not permitted to be carried by visitors. As another example, client devices 106 having a capture sensor, whether the sensor is enabled or disabled, are not permitted to be carried into the facility.

As another example, client devices 106 that have certain applications installed or client devices 106 that have been modified in some way, whether they are in or out of compliance with the compliance rules 125 of the user's enterprise are not permitted to be carried into the facility. In this way, the security policies of a particular facility associated with the verification computing device 107 can determine whether the client device 106 is permitted into the facility, and even if the device is in compliance with all of its enterprise's compliance rules 125 (i.e., "the first set of compliance rules 125" described above), the client device 106 can still be denied approval by the verification application 153 if the compliance status 129 indicates any status information that would violate the facility's security policies (i.e., "the second set of compliance rules 125" described above). Additionally, because there is a trusted computing relationship between the verification device 107 and the enterprise computing environment 103 (and management service 116 provided thereby), the verification application 153 can trust the validity of the device posture token 151 (and the contents thereof). Also, because the device posture token 151 can be configured to expire, security personnel associated with a facility can be assured that the person presenting the token is not presenting a token that was generated at a time when the client device 106 did comply, as an expired token could not be used to verify that the client device 106 currently complies. As described above, the device posture token 151 can also merely comprise a credential and/or network-driven API command, which can further provide a technical solution for preventing "stale" state information or compliance status to be relied upon as the verification device 107 can use such a device posture token 151 to access information describing the client device 106 at the time the client device 106 last checked into or communicated with the management service 116.

If the client device 106 complies with the security policies of an organization, such as a government or corporate facility in which the verification device 107 is used, security personnel of such facility can determine whether to permit a user of the client device 106 to bring the client device 106 into the facility. The security personnel can also determine whether the client device 106 must be surrendered by the user before entering the facility based upon the device posture token 151.

Figure 2:
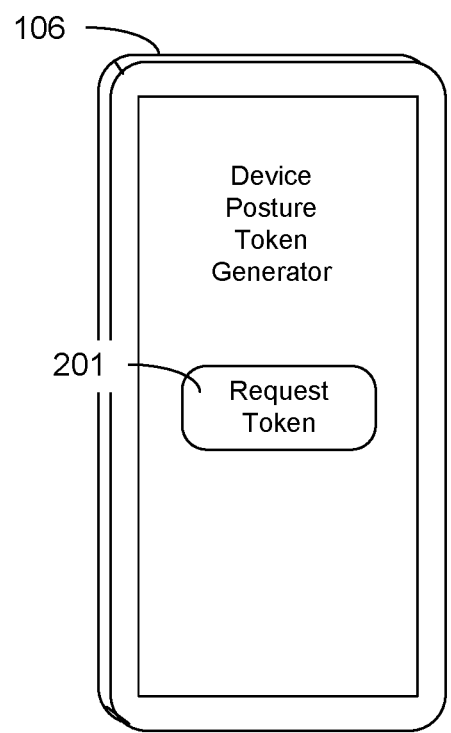
FIGS. 2-3 are examples of the device token application according to examples of the disclosure.

Referring next to FIG. 2, shown is an example of how the device token application 149 can request a device posture token 151 from the device token generator 120. In some examples, the device token application 149 can request the device posture token 151 from the management service 116, as the device token generator 120 functionality can be included within the management service 116. In one scenario, a user of a computing device may enter a facility that may have security policies governing whether mobile devices, tablets, or computers can be brought into the facility and what capabilities or compliance status of devices such devices must have to be permitted within the facility. Accordingly, to facilitate allowing users or guests to bring their devices into a facility or through a security checkpoint, security personnel can request that the user generate and present a device posture token 151. The user can present the device posture token 151 if he or she has a client device 106 enrolled with a management service 116 that has a trust relationship with a verification device 107 operated by the security personnel.

To cause such a device posture token 151 to be accessible to the client device 106, the device token application 149 can request that the management service 116 generate the device posture token 151 and transmit the device posture token 151 to the client device 106 in an instance in which a button 201 within the device token application 149 is activated by a user of the client device 106. The device token application 149 can also request a device posture token 151 upon launching of the application or can periodically request device posture tokens 151 as a background process.

Figure 3:
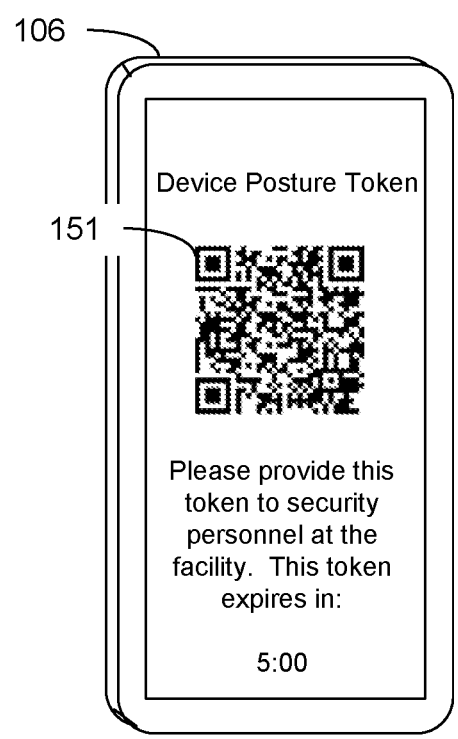

Referring next to FIG. 3, in the depicted scenario, the device token application 149 has obtained a device posture token 151 from the device token generator 120 and has displayed a representation of the device posture token 151 on the display of the client device 106. The device posture token 151 can be obtained as an encrypted alphanumeric string or numeric value. The device posture token 151 can be displayed by the device token application 149 in a QR code or another barcode that can be visually encoded. In some examples, the device posture token 151 can be transmitted to a verification device 107 over NFC, Wi-Fi, Bluetooth, or other network protocols and standards. As shown in FIG. 3, the device posture token also expires, and the device token application 149 can display a countdown time that indicates to the user when the device posture token 151 will expire.

Figure 4:
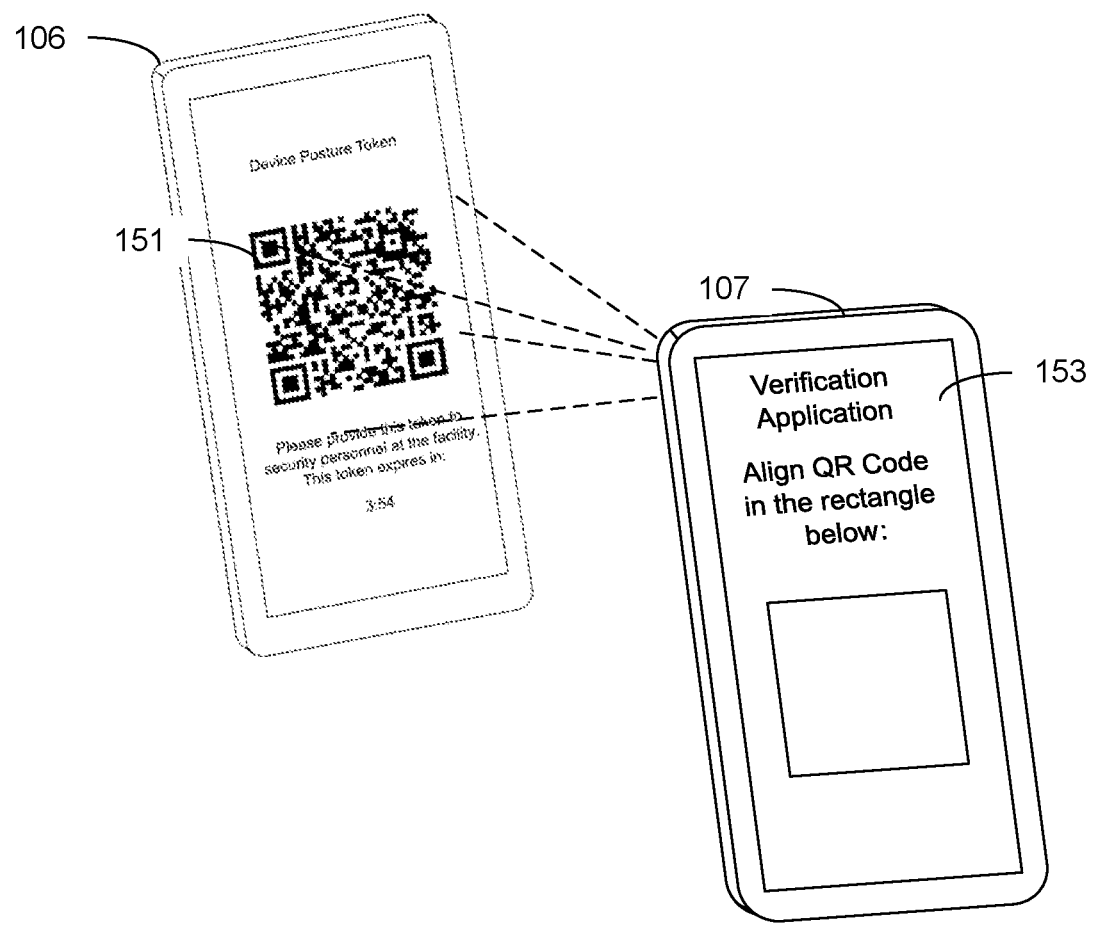
FIGS. 4-5 are examples of the device token application and verification application according to examples of the disclosure.

Referring next to FIG. 4, shown is an illustration of the verification application 153 executed by the verification device 107 obtaining the device posture token 151 from the client device 106. In this scenario, the verification device 107 can be operated by security personnel associated with a particular facility. The verification application 153 can instruct the security personnel how to obtain the device posture token 151 from the client device 106 of a user, such as by providing instructions through a user interface displayed by the verification device 107. In the depicted example, the device posture token 151 is obtained by capturing the QR code using a camera or barcode scanner integrated within or in communication with the verification device 107. In some examples, the device posture token 151 can be obtained by the verification application 153 through an NFC session, a Bluetooth communication session, or any other network protocol or standard.

Figure 5:
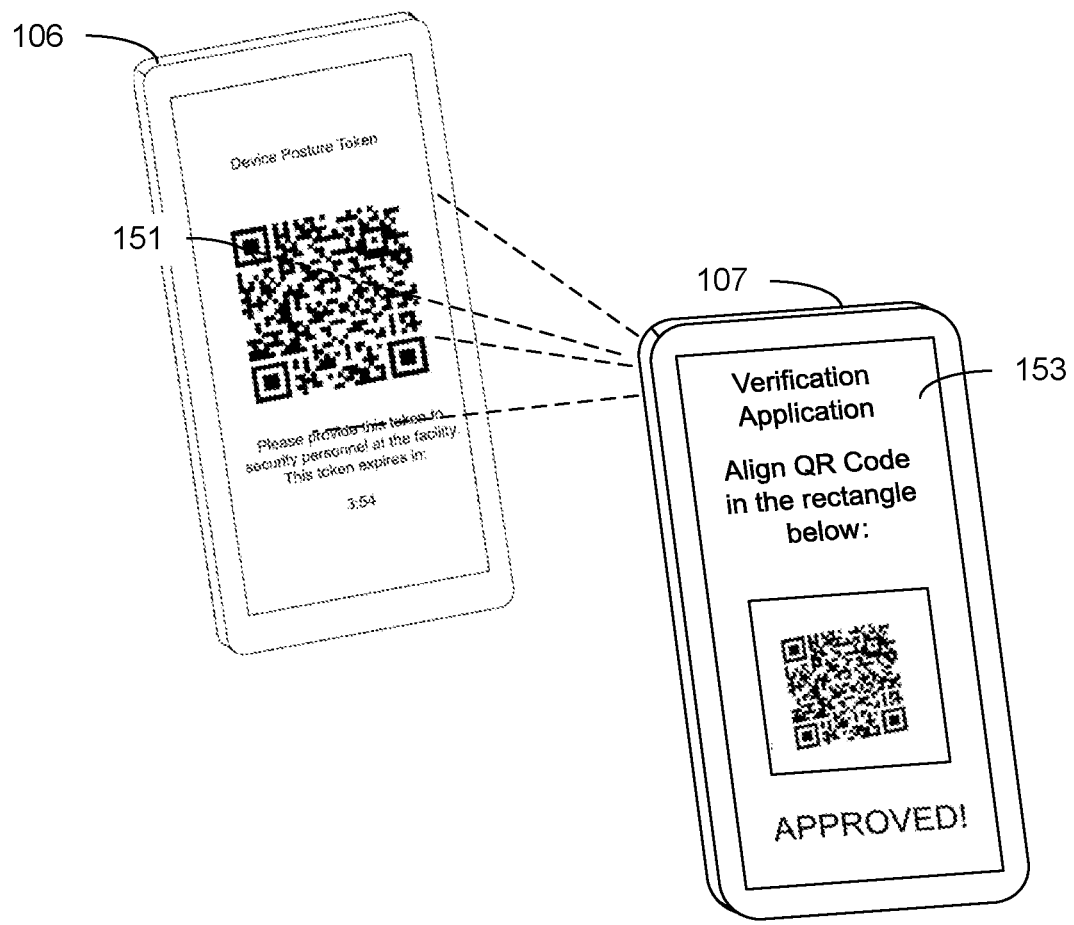

Referring next to FIG. 5, shown is an illustration of the device posture token 151 being obtained and validated by the verification application 153 of the verification device 107. As shown in FIG. 5, once the device posture token 151 is obtained, the verification application 153 can verify that the device posture token 151 is authentic and determine whether the client device 106 complies with the security policies of a particular facility based at least in part on the information embedded within the device posture token 151.

In some examples, the verification application 153 can decrypt the device posture token 151 using the public key installed on the verification device 107. If the data within the device posture token 151 indicates that the client device 106 complies with the applicable security policies, the verification application 153 can display an indication that the client device 106 (or its admittance request) is approved. If the data within the device posture token 151 indicates that the client device 106 does not comply with the applicable security policies, the verification application 153 can display an indication that the client device 106 (or its admittance request) is denied. Based on the given result displayed by the verification application 153, the security personnel of the facility can either permit the client device 106 to be taken into the facility (i.e., upon an "approved" result) or can prohibit the client device 106 from being taken into the facility (i.e., upon a "denied" result). In this way, security personnel can, without having substantial training, quickly and accurately restrict usage of incompliant client devices 106 within the facility by using the verification application 153 to screen each client device 106 seeking access to the facility.

Figure 6:
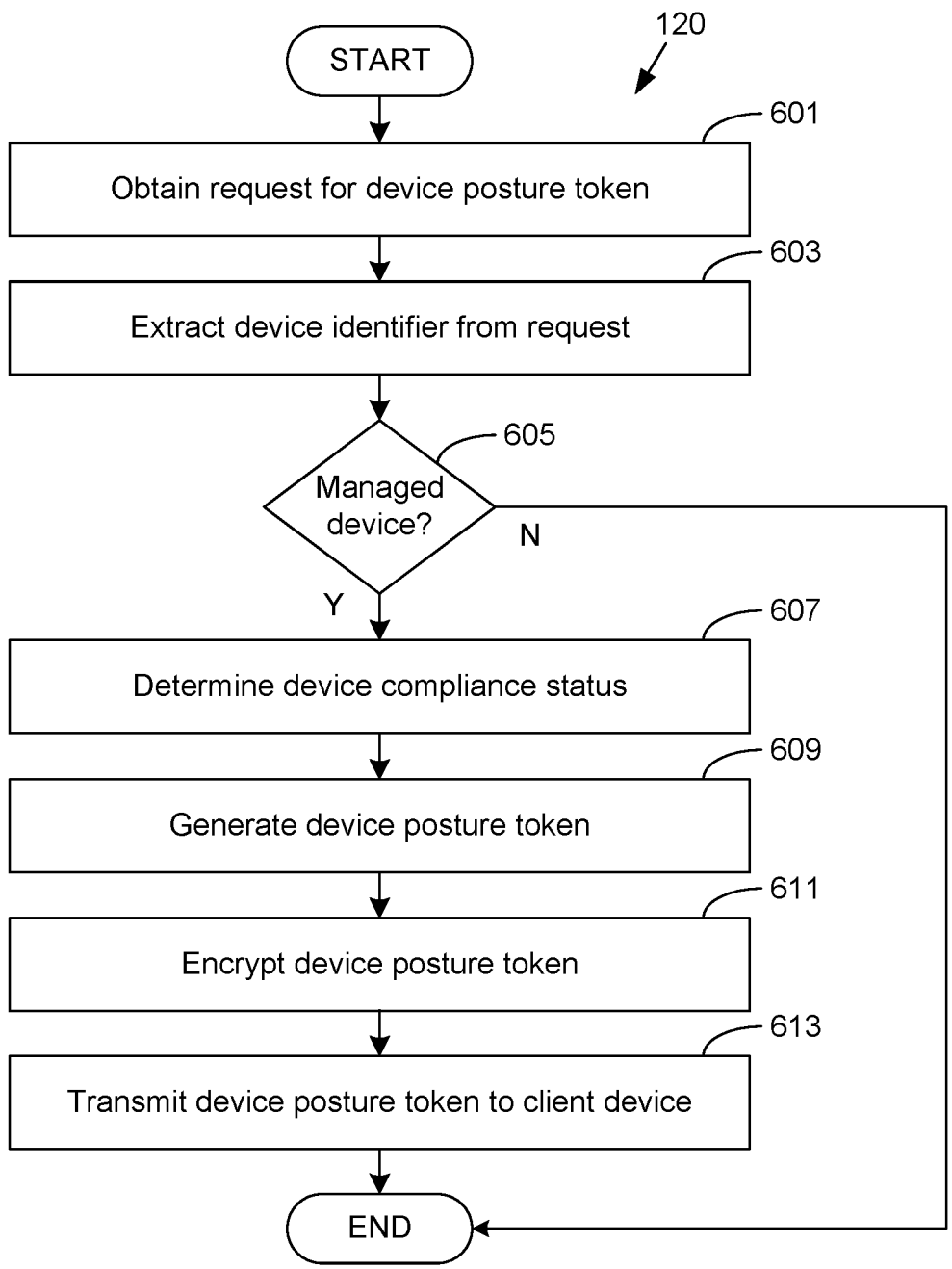
FIGS. 6-8 are flowcharts that illustrate functionality according to examples of the disclosure.

Referring to FIG. 6, shown is a flowchart that provides one example of how the device token generator 120 can generate a device posture token 151 for a client device 106. In one example, the device token generator 120 can be executed by the enterprise computing environment 103 or the management service 116, such as in response to instructions from one or more of the management service 116, the management component 145, or the device token application 149. In another example, the device token generator 120 can be executed by the client device 106 or the management component 145, such as in response to instructions from one or more of the management service 116, the management component 145, or the device token application 149.

Beginning at step 601, the device token generator 120 can obtain a request for a device posture token 151 from a device token application 149 executed by a client device 106. The request can include a device identifier with which the device can be identified. At step 603, the device token generator 120 can extract the device identifier from the request. At step 605, the device token generator 120 can determine whether the requesting client device 106 is enrolled with the management service 116 as a managed device. If not, the process can proceed to completion, as the device token generator 120 cannot generate a device posture token 151 for a client device 106 that is not enrolled with the management service 116 (as administrative privileges can be required by some operating systems to identify state information describing the client device 106).

Otherwise, the process can proceed to step 607, where the device token generator 120 can determine a compliance status 129 of the client device 106. At step 609, the device token generator 120 can generate the device posture token 151. As noted above, the device posture token 151 can be an alphanumeric representation of the compliance status 129 of the client device 106 and potentially other status information associated with the client device 106. In one example, the representation of the compliance status 129 and other status data can include one or more key-value pairs, where the key is an identifier of a compliance rule 125 or a status variable, and the value represents the status of the client device 106.

Then, at step 611, the device token generator 120 can encrypt the device posture token 151 using a private key corresponding to a public key installed on the verification computing device 107. In one example, the management service 116 or management component 145 can generate a pair of a private key and corresponding public key, can cause the private key to be stored in a memory location accessible to the device token generator 120, and can cause the public key to be stored in a memory location accessible to the verification application 153. In another example, the management service 116 or management component 145 can request a third-party service or library to generate the private key and corresponding public key and request that both be provided to the requesting service or component, respectively. In such scenario, the management service 116 or management component 145 can thereafter cause the private key to be stored in a memory location accessible to the device token generator 120, and can cause the public key to be stored in a memory location accessible to the verification application 153.

Further, at step 613, the device token generator 120 can provide the device posture token 151 to the requesting client device 106. In one example, the device posture token 151 can be transmitted to the client device 106 through a device management communication channel established between the management service 116 and the management component 145 or device token application 149. In another example, the device posture token 151 can be stored by the device token generator 120 in a memory location of the client device 106 that is accessible to the device token application 149, such as when the device token generator 120 is executed within the client device 106.

Figure 7:
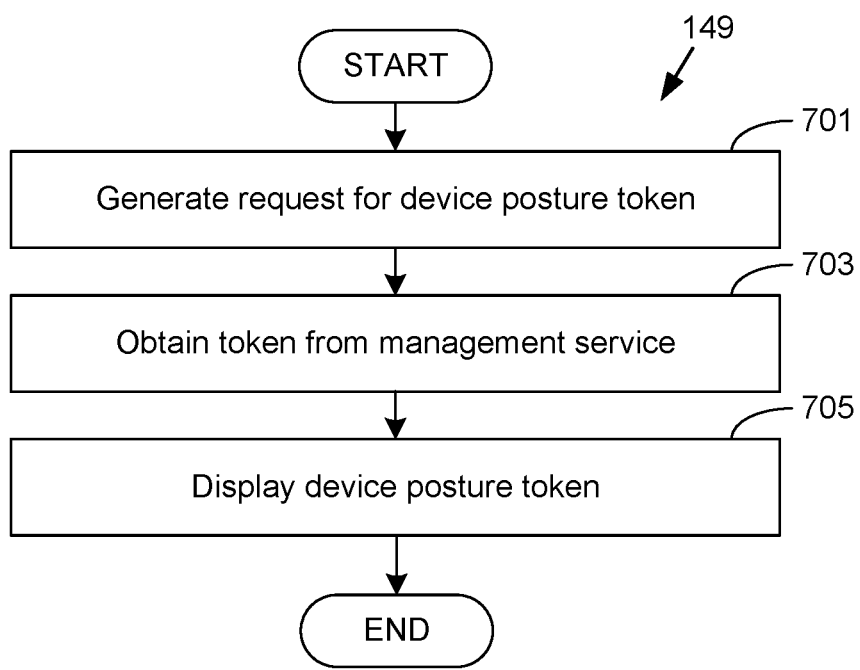

Referring next to FIG. 7, shown is a flowchart that provides one example of how the device token application 149 can obtain device posture token 151 from the device token generator 120.

Beginning at step 701, the device token application 149 can generate a request for a device posture token 151 associated with a particular client device 106. The request can include a device identifier corresponding to the client device 106 and be transmitted to the device token generator 120. In one example, the device token application 149 can cause the request to be transmitted to the management service 116 or the management component 145 to cause such service or component to generate a device posture token 151 associated with a particular client device 106.

Next, at step 703, the device token application 149 obtains the device posture token 151 from the device token generator 120. In one example, the device token application 149 receives the device posture token 151 from the enterprise computing environment 103 executing the device token generator 120. In another example, the device token application 149 receives the device posture token 151 from the management component 145 executed by the client device 106. In a further example, the device token application 149 obtains the device posture token 151 from a memory location accessible to the device token application 149 where the device token generator 120 caused the device posture token 151 to be stored.

Then, at step 705, the device token application 149 can display the device posture token 151. As noted above, the device posture token 151 can be displayed in a QR code or another visual representation of the device posture token 151.

Figure 8:
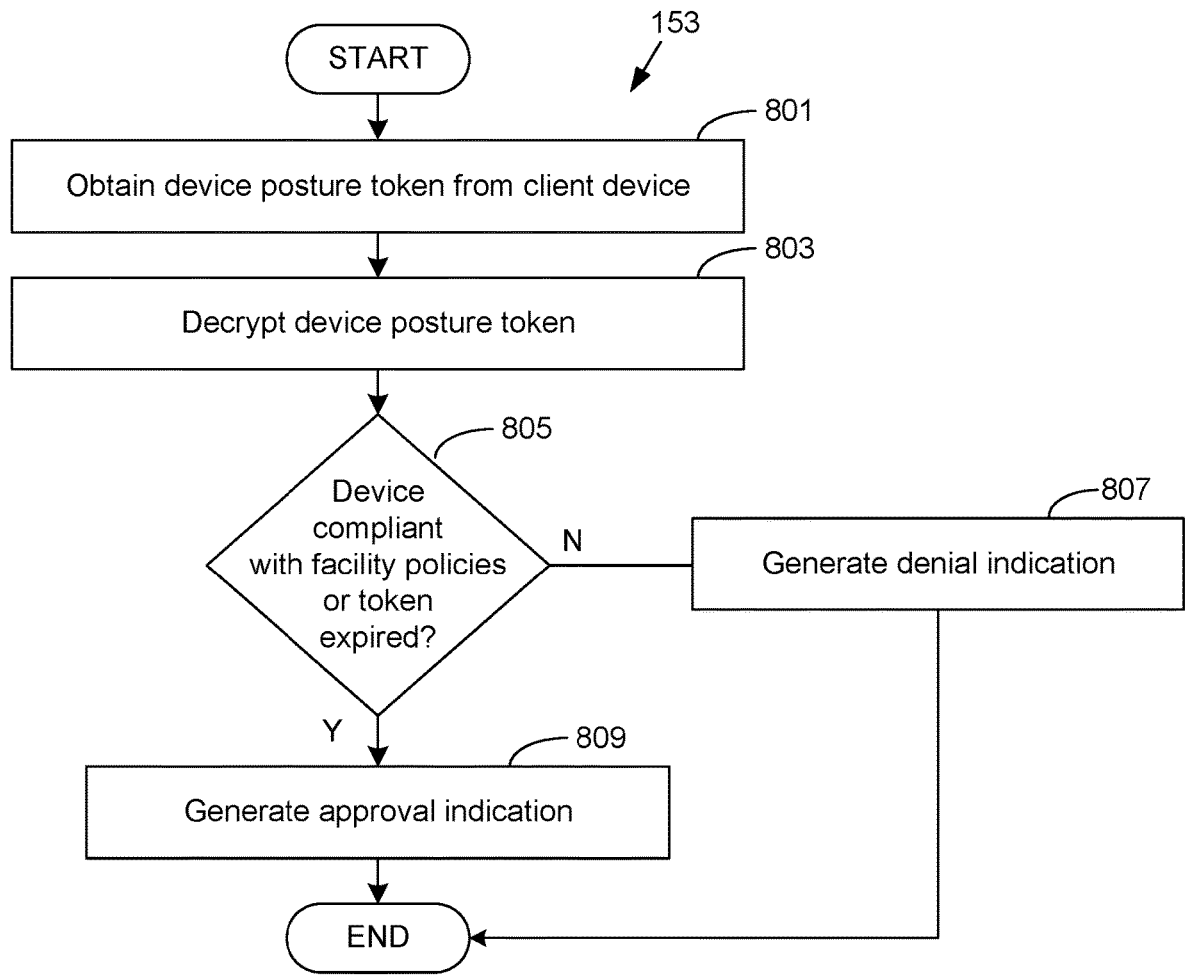

Referring next to FIG. 8, shown is a flowchart that provides one example of how the verification application 153 can verify compliance of a client device 106 with the security policies of a particular facility based upon a device posture token 151.

Beginning at step 801, the verification application 153 can obtain a device posture token 151 from a client device 106. In one example, the verification application 153 can obtain the device posture token 151 by capturing a QR code that the client device 106 has displayed on a user interface of a display of the client device 106.

Next, at step 803, in the event that the device posture token 151 is encrypted, the verification application 153 can decrypt the device posture token 151 using the public key corresponding to the enterprise computing environment 103. However, if the device posture token 151 is not encrypted, the process can proceed to step 805.

Then, at step 805, the verification application 153 can determine whether the client device 106 complies with the security policies of a particular facility or whether the device posture token 151 has expired. If the client device 106 does not comply with the security policies of the facility or if the device posture token 151 has expired based upon a timestamp or expiry timestamp embedded within the token, the process can proceed to step 807. Alternatively, if the client device 106 does comply with the security policies of the facility, the process can proceed to step 809.

At step 807, the verification application 153 can generate a denial indication that can be displayed on a display of the verification device 107 by the verification application 153. Thereafter the process can proceed to completion.

At step 809, the verification application 153 can generate an approval indication that can be displayed on a display of the verification device 107 by the verification application 153. Thereafter the process can proceed to completion.

The flowcharts of FIGS. 6-8 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 6-8 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, enterprise computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or more processors of the processing circuit. Also, a data store can be stored in the one or more storage devices.

The management service 116, device token generator 120, device token application 149, verification application 153, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for generating a device posture token, comprising:
  at least one computing device comprising a processor and a memory; and
  a device token generator executable by the at least one computing device, the device token generator causing the at least one computing device to at least:
    obtain a request for a device posture token associated with a client device;
    determine a device compliance status associated with the client device, the device compliance status indicating compliance with a plurality of compliance rules enforced by a management service executed remotely from the client device with which the client device is enrolled as a managed device, wherein the client device is enrolled as a managed device with the management service and a management component is installed on the client device with administrative privileges on the client device;
    generate the device posture token, wherein the device compliance status is embedded within the device posture token;
    encrypt the device posture token using a public key corresponding to the management service, wherein a private key corresponding to the public key is withheld from the client device;
    cause the encrypted device posture token to be accessible to the client device.

2. The system of claim 1, wherein the device posture token comprises an alphanumeric value embedded in a quick-response code displayed by the client device.

3. The system of claim 1, wherein the device posture token comprises a representation of the device compliance status of the client device, the representation of the device compliance status identifying whether the client device complies with a plurality of compliance rules associated with the client device.

4. The system of claim 1, wherein the device posture token comprises an identity of applications installed on the client device or an indication of whether a hardware feature or software feature has been enabled or disabled on the client device.

5. The system of claim 1, wherein the device posture token is encrypted with a private key associated with the device token generator.

6. The system of claim 5, wherein a trust relationship is established between a verification computing device and the at least one computing device by causing a public key corresponding to the private key to be accessible to the verification computing device.

7. The system of claim 6, wherein a verification computing device is configured to decrypt the device posture token using the public key corresponding to the private key.

8. A method for generating a device posture token, comprising:
  obtaining a request for a device posture token associated with a client device;
  determining a device compliance status associated with the client device, the device compliance status indicating compliance with a plurality of compliance rules enforced by a management service executed remotely from the client device with which the client device is enrolled as a managed device, wherein the client device is enrolled as a managed device with the management service and a management component is installed on the client device with administrative privileges on the client device;
  generating the device posture token, wherein the device compliance status is embedded within the device posture token;
  encrypting the device posture token using a public key corresponding to the management service, wherein a private key corresponding to the public key is withheld from the client device; and
  causing the encrypted device posture token to be accessible to the client device.

9. The method of claim 8, wherein the device posture token comprises an alphanumeric value embedded in a quick-response code displayed by the client device.

10. The method of claim 8, wherein the device posture token comprises a representation of the device compliance status of the client device, the representation of the device compliance status identifying whether the client device complies with a plurality of compliance rules associated with the client device.

11. The method of claim 8, wherein the device posture token comprises an identity of applications installed on the client device or an indication of whether a hardware feature or software feature has been enabled or disabled on the client device.

12. The method of claim 8, wherein the device posture token is encrypted with a private key associated with a device token generator configured to generate the device posture token.

13. The method of claim 12, wherein a trust relationship is established with a verification computing device by causing a public key corresponding to the private key to be accessible to the verification computing device.

14. The method of claim 13, wherein a verification computing device is configured to decrypt the device posture token using the public key corresponding to the private key.

15. A non-transitory computer-readable medium comprising machine-readable instructions for generating a device posture token, wherein when executed by a processor of at least one computing device, the machine-readable instructions cause the at least one computing device to at least:
  obtain a request for a device posture token associated with a client device;
  determine a device compliance status associated with the client device, the device compliance status indicating compliance with a plurality of compliance rules enforced by a management service executed remotely from the client device with which the client device is enrolled as a managed device, wherein the client device is enrolled as a managed device with the management service and a management component is installed on the client device with administrative privileges on the client device;
  generate the device posture token, wherein the device compliance status is embedded within the device posture token;
  encrypt the device posture token using a public key corresponding to the management service, wherein a private key corresponding to the public key is withheld from the client device; and
  cause the encrypted device posture token to be accessible to the client device.

16. The non-transitory computer-readable medium of claim 15, wherein the device posture token comprises an alphanumeric value embedded in a quick-response code displayed by the client device.

17. The non-transitory computer-readable medium of claim 15, wherein the device posture token comprises a representation of the device compliance status of the client device, the representation of the device compliance status identifying whether the client device complies with a plurality of compliance rules associated with the client device.

18. The non-transitory computer-readable medium of claim 15, wherein the device posture token comprises an identity of applications installed on the client device or an indication of whether a hardware feature or software feature has been enabled or disabled on the client device.

19. The non-transitory computer-readable medium of claim 15, wherein the device posture token is encrypted with a private key associated with the management service.

20. The non-transitory computer-readable medium of claim 19, wherein a verification computing device is configured to decrypt the device posture token using a public key corresponding to the private key.

* * * * *